United States Patent
Lanovich et al.

[11] Patent Number: 6,005,231
[45] Date of Patent: Dec. 21, 1999

[54] METHOD FOR DETERMINING THE TEMPERATURE OF A THERMOLUMINESCENCE ELEMENT BEING HEATED FOR THERMOLUMINESCENCE DOSIMETRY

[75] Inventors: Steven J. Lanovich, Evergreen Park; Lucian Predescu, Chicago, both of Ill.

[73] Assignee: Matsushita Industrial Equipment Corp. of America, Elmhurst, Ill.

[21] Appl. No.: 09/087,101

[22] Filed: May 29, 1998

[51] Int. Cl.$^6$ .................................................. H05B 1/02
[52] U.S. Cl. ........................ 219/502; 250/71 R; 250/337; 250/336.1
[58] Field of Search .................................... 219/502, 490; 250/71 R, 337, 336.1, 370, 473, 301

[56] References Cited

U.S. PATENT DOCUMENTS

| | | |
|---|---|---|
| 3,590,245 | 6/1971 | Oonishi et al. . |
| 3,725,659 | 4/1973 | Culley .................................... 250/71 R |
| 3,729,630 | 4/1973 | Yamashita et al. . |
| 3,792,277 | 2/1974 | Yamashita et al. . |
| 3,927,328 | 12/1975 | Kawabata et al. ........................ 250/473 |
| 3,975,637 | 8/1976 | Ikedo et al. . |
| 4,105,918 | 8/1978 | Miyagawa et al. . |
| 4,204,119 | 5/1980 | Yasuno et al. . |
| 4,480,189 | 10/1984 | Miyake et al. ............................ 250/337 |
| 4,827,132 | 5/1989 | Moscovitch .............................. 210/337 |
| 5,572,027 | 11/1996 | Tawil et al. ............................ 250/336.1 |
| 5,606,163 | 2/1997 | Houston et al. .......................... 250/337 |

*Primary Examiner*—Mark Paschall
*Assistant Examiner*—Jeffrey Pwu
*Attorney, Agent, or Firm*—Brinks Hofer Gilson & Lione

[57] ABSTRACT

A method and apparatus for measuring radiation doses based upon thermoluminescence which occurs when a thermoluminescence element is heated by a heat source after having been exposed to radiation. A heat energy sensor is provided for the heat source for detecting the heat energy output from the heat source toward the element. Based on the detected heat energy, the temperature of the element is calculated. The calculated temperature is used to determined if remedial action is necessary. For instance, the calculated temperature may be compared with a predetermined optimum heating temperature. If the calculated temperature deviates from the predetermined optimum heating temperature, responsive action is taken. An increase rate of the calculated temperature may also be calculated. The calculated increase rate would be compared with a predetermined heating rate. The heating device would increase its heat energy output from it if the calculated increase rate is lower than the predetermined heating rate and decreasing the heat energy if the calculated increase rate is higher than the predetermined heating rate.

21 Claims, 3 Drawing Sheets

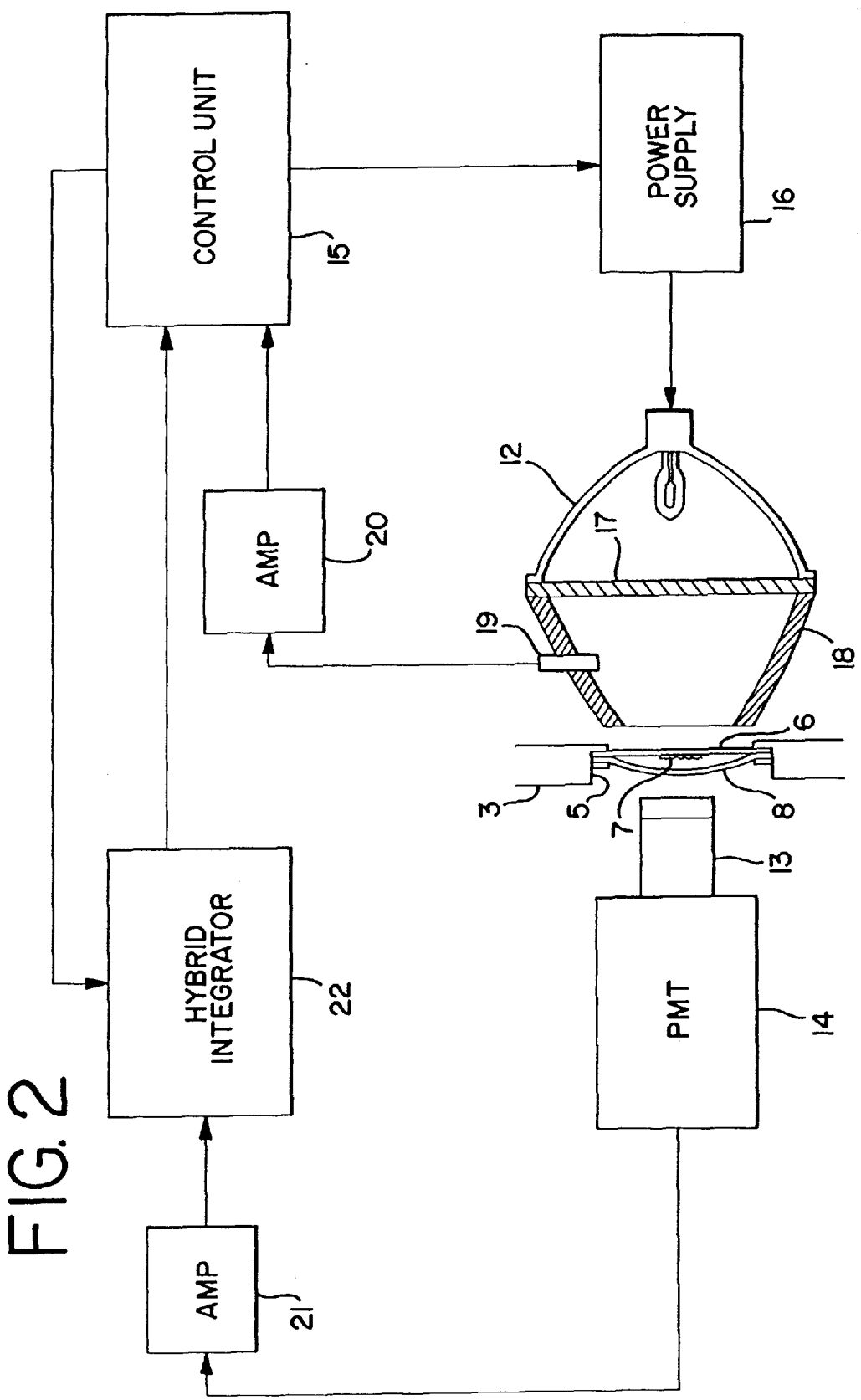

METHOD FOR DETERMINING THE TEMPERATURE OF A THERMOLUMINESCENCE ELEMENT BEING HEATED FOR THERMOLUMINESCENCE DOSIMETRY

The invention herein disclosed relates to thermoluminescence dosimetry and, more particularly, to a method and apparatus for measuring radiation doses using thermoluminescence dosimetry.

BACKGROUND

Thermoluminescence dosimetry (TLD) is a technique for measuring radiation doses, using a dosimeter. The dosimeter contains thermoluminescence (TL) elements made of a TL phosphor. When exposed to radiation, a TL element gets activated by the radiation energy. Thermoluminescence is a release of this absorbed radiation energy in the form of light which occurs when the TL element is heated. The amount of light energy discharged from the TL element corresponds to a dose of the radiation received by it. The amount of light energy discharged from the TL element is calculated by integrating the intensity of the thermoluminescence over a time it is observed.

The TLD has been developed to monitor environments in radiation fields. One particular application of the TLD is to monitor doses of radiation sustained by personnel who work in nuclear power plants. Each person working in a nuclear power plant is required to carry a dosimeter called a "TLD badge." The badge contains a TLD plate with one to four TL elements on it. Each person must wear the badge so that the badge will be exposed to the same dose of radiation as the person wearing the badge. Periodically, the badges are processed through a TLD reader to obtain an exposure record for each person being monitored. In the TLD reader, the TL elements on each TLD plate are heated by a heating device, such as an infrared lamp, and thermoluminescence from the elements is detected by a photomultiplier tube and processing circuitry. The detected thermoluminescence is then analyzed by an associated computer. Currently, processing of the TL badges is fully automated, and the TLD readers are capable of successively processing a large number of badges without human intervention. An example of such an automatic TLD reader is a Panasonic TLD Reader UD-710 or a Panasonic TLD reader UD-7900M.

The intensity of thermoluminescence from the TL elements is a function of heating temperature and time. To obtain accurate reading of radiation doses, the TL elements must be heated to a particular temperature for a particular period of time. The optimum heating temperature and time are selected through experiments. In the TLD reader mentioned above, the heating device is operated with programmed parameters so as to heat all the TL elements uniformly to the same optimum temperature for the same optimum time. However, the heat energy output from the heating device tends to change even though the heating device is operated with the same operation parameters. For instance, the heating temperature of the heating device gradually rises as the TLD reader processes the badges because of heat accumulated in the heating device. Also, the heating temperature of the heating device changes as the heating device ages. If the heating temperature exceeds or falls short of the optimum level, reading of radiation doses by the TLD reader will no longer be accurate.

Numerous attempts have been made to provide the TLD reader with a heat sensor for measuring in real-time the temperature of a TL element being heated. The TLD reader, if provided with such a heat sensor, could display to an operator the temperature of a TL element being heated or could alert the operator to deviation of the heating temperature from the optimum temperature level. But these attempts have all been unsuccessful. The problem is that a heat sensor cannot be positioned in place near the TLD element being heated. The heating device must be placed on one side of the TLD plate as closely to the target TL element as possible in order to excluding any outside thermal disturbances and heat all the TL elements uniformly. The photomultiplier must be placed on the other side of the TLD plate as closely to the target element as possible because thermoluminescence from the element is so weak. Simply, there is no physical space for any heat sensor near the TLD element being heated.

SUMMARY OF THE INVENTION

The present invention provides a TLD method and apparatus which can calculate the temperature of the TL element being heated. According to this invention, heat energy output from the heating device is detected by a heat energy sensor. The heat energy sensor may be positioned between the heating device and the TL element being heated. Based on the detected heat energy, the temperature of the element is calculated using a special equation. The calculated temperature is then used to determine if remedial action is necessary. For example, the calculated temperature is compared with a predetermined optimum heating temperature. If the calculated temperature deviates from the predetermined optimum heating temperature, responsive action is taken to prevent inaccurate radiation dose measurements.

According to another aspect of the invention, an increase rate of the calculated temperature is calculated and compared with a predetermined optimum heating rate. The heating device is controlled to increase its heat energy output if the calculated increase rate is lower than the predetermined optimum heating rate, and decrease its heat energy output if the calculated increase rate is higher than the predetermined optimum heating rate.

In a TLD apparatus in which the heat energy is output from the heat source in the form of heat pulses, the heat energy output is increased by raising the heights of the heat pulses, and decreased by lowering the heights of the heat pulses. The heat energy output may also be changed by widening or narrowing the widths of the heat pulses.

These and other objects of the invention are hereinafter fully described and particularly pointed out in the claims. The following description and the annexed drawings set forth in detail certain illustrative embodiments of the invention. These embodiments are indicative, however, of but one of the various ways in which the principles of the invention may be employed.

BRIEF DESCRIPTION OF THE DRAWINGS

In the annexed drawings:

FIG. 2 is a block diagram illustration showing the TLD reader in accordance with this invention;

DETAILED DESCRIPTION OF THE INVENTION

Figure 1:
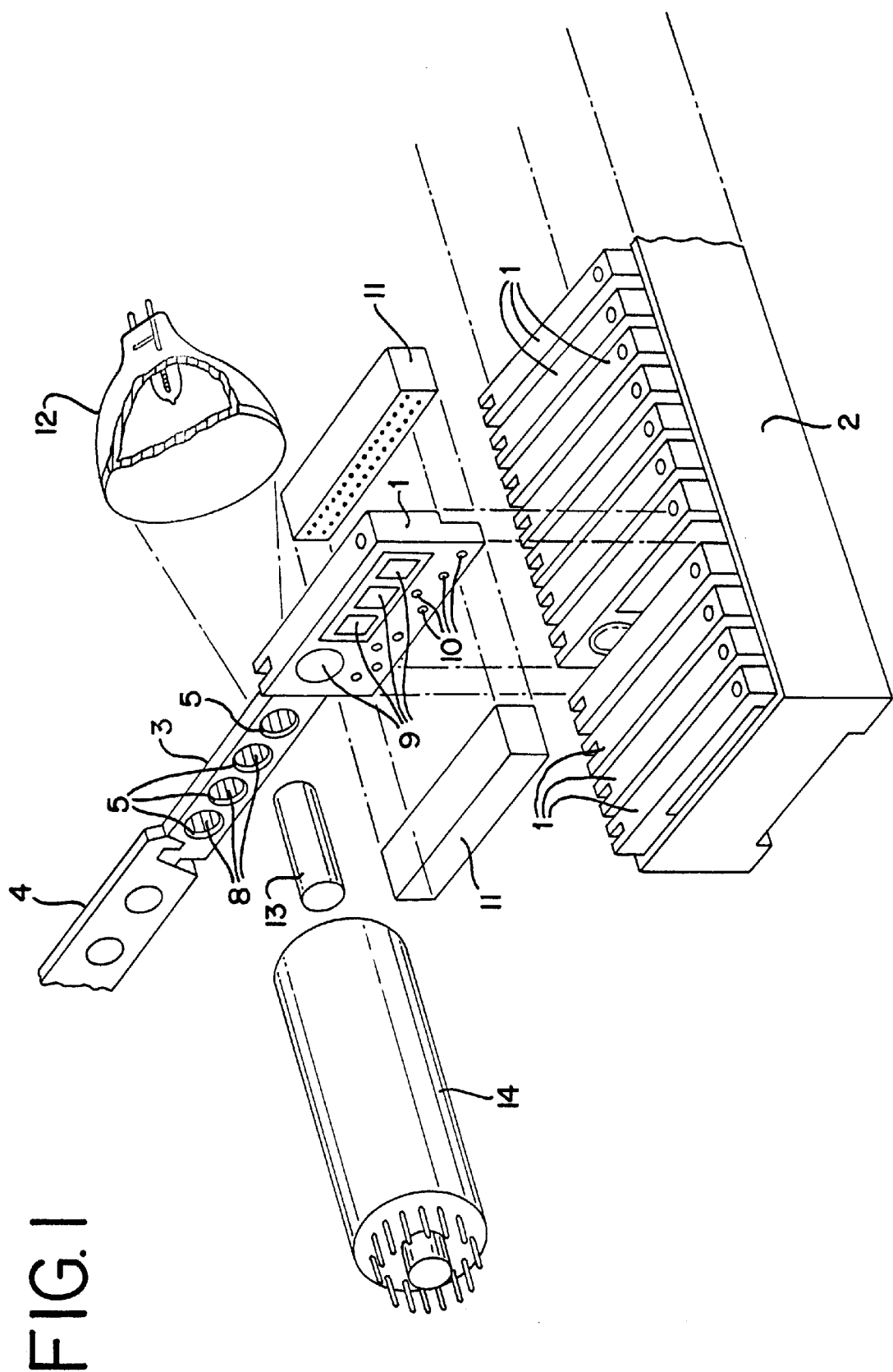
FIG. 1 is an illustration showing the mechanism employed in the TLD reader of this invention for automatically processing TLD badges.

Referring to the drawings, preferred embodiments of this invention are explained in detail. FIG. 1 shows the mechanism employed in the TLD reader of this invention for automatically processing TLD badges. FIG. 2 shows a block diagram of the same TLD reader.

As shown in FIG. 1, used badges 1 are placed side by side in an elongated magazine 2, which is then loaded into the TLD reader. In the TLD reader, the badges 1 are taken out from the magazine 2 one by one for reading of radiation doses. The badge 1 contains a TLD plate 3. An actuator arm 4 is used to remove the TLD plate 3 from the badge 1. The TLD plate 3 has four holes 5 arranged along its length. As shown in FIG. 2, each of the holes 5 contains a carbon loaded polyamide substrate 6. In the center of the substrate 6, the TL element 7 is positioned and covered with a fluororesin film 8. Those TL elements 7 are made of a TL phosphor, such as $CaSO_4$ or $Li_2B_4O_7$. When the TL elements 7 are heated after having been exposed to radiation, thermoluminescence occurs at an intensity and for an interval of time correlatable to a dose of the radiation received by the elements.

As shown in FIG. 1, the badge 1 has four filters 9 of different thicknesses each located in a position corresponding to one of the holes 5. Thus, each TL element 7, which is not shown in FIG. 1 but located in the hole 5 between the substrate 6 and the fluororesing film 8, is covered by its own unique filter which provides different radiation absorption thicknesses to allow determination of type of radiation (Gamma, Beta, etc.) and radiation doses received by the person who wore the badge. The badge 1 is also provided with a machine readable code 10 to enable automatic identification of the person who wore the badge. The code 10 is scanned by an optical reading device 11. The TLD reader has an infrared lamp 12, and a photomultiplier tube 14 with a light guide 13 placed opposite to the lamp 12.

After a badge 1 is taken out from the magazine 2, the TLD plate 3 is removed from the badge 1 by the actuator arm 4. The TLD plate 3 removed from the badge 1 is positioned between the lamp 12 and the light guide 13. The lamp 12 then heats a target TL element 7 of the TLD plate 3. The light guide 13 collects thermoluminescence from the element 7. The photomultiplier 14 detects the thermoluminescence and converts it into electrical signals. After one element has been processed, the TLD plate is moved along its length, and the lamp 12 heats an adjacent element 7. The lamp 12 heats one element at a time and thus repeats its heat treatment up to four times for one badge. In the meantime, the optical reading device 11 scans the code 10 provided for the badge 1 to identify the person who wore the badge.

Turning to FIG. 2, the TLD reader according to the present invention has a control unit 15. The control unit 15 transmits pulse signals to the lamp 12 through a power supply 16 to turn on and off the lamp 12. The lamp 12 is fronted with a silicon filter 17 which allows only infrared light to pass through. The lamp 12 is also provided with a cone-shaped reflector 18 for focusing infrared light passing through the filter 17 onto a target element 7 positioned in front of the reflector 18. The distance between the light guide 13 and the reflector 18 is made as small as almost equal to the thickness of the TLD plate 3 for the purpose of effectively focusing infrared light onto the element 7 and collecting as much thermoluminescence from the element 7 as possible. The reflector 18 of the lamp 12 is provided in its periphery with a heat flux sensor 19 sticking into the interior of the reflector 18. The heat flux sensor 19 detects heat energy inside the reflector 18 and transmits signals through an amplifier 20 to the control unit 15. A heat flux sensor having these capabilities is a Thermogage HFM6 manufactured and sold by Vatell Corporation, Blackburg, Va.

As mentioned earlier, a radiation dose is calculated by integrating the intensity of thermoluminescence over a time it is observed. The photomultiplier 14 converts thermoluminescence into electrical signals and transmits those signals through an amplifier 21 to a hybrid integrator 22. The hybrid integrator 22 contains photon and frequency counters. Based on the signals from the photomultiplier 14, the hybrid integrator 22 counts photons emitted from the TL element 7 for millisecond intervals and transmits a photon count to the control unit 15 at every millisecond. A photon count at particular point in time represents the intensity of thermoluminescence at the same point. The control unit 15 performs various tasks based upon the photon counts transmitted by the hybrid integrator 22. One of the important tasks for the purpose of this invention is to determine a radiation dose. The control unit 15 calculates a radiation dose by integrating the photon counts transmitted by the hybrid integrator 22.

Figure 3A:
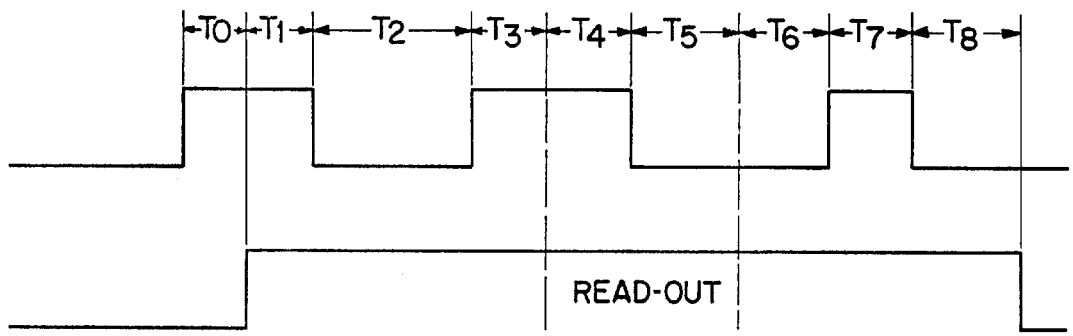
FIG. 3(a) is a graph showing heat pulses (lamp on time) output from the heating device of the TLD reader in accordance with this invention.
Figure 3B:
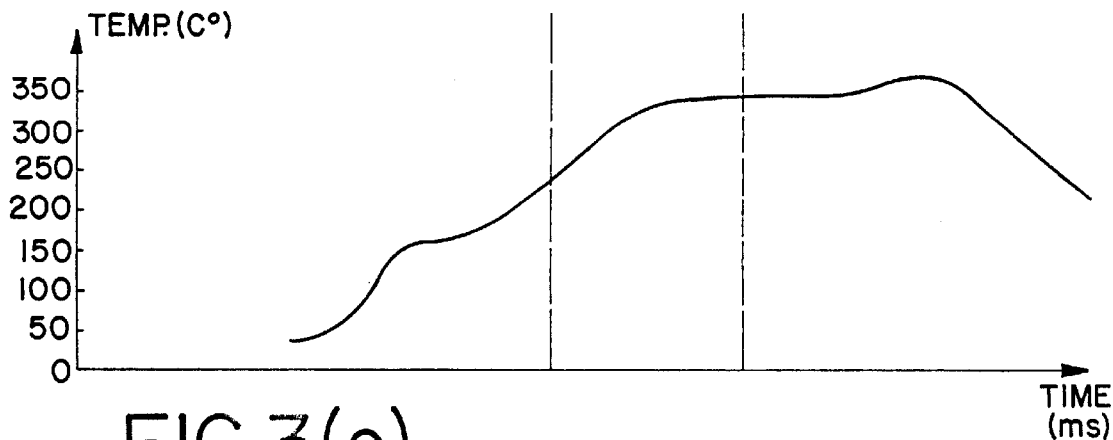
FIG. 3(b) is a graph showing a typical temperature curve exhibited by the TL element being heated.
Figure 3C:
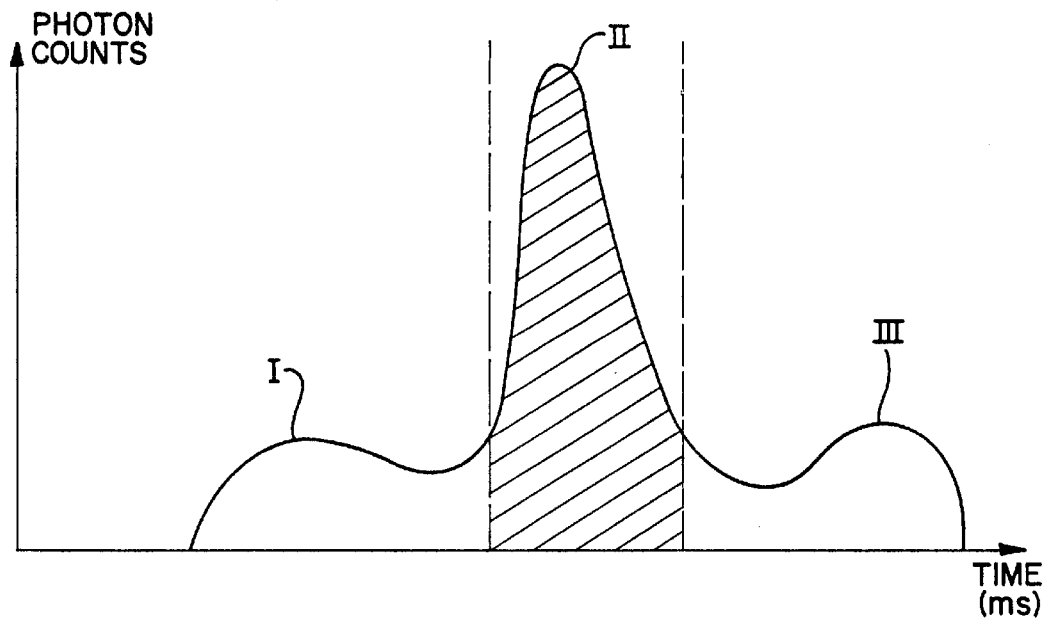
FIG. 3(c) is a graph showing a typical glow curve exhibited by the TL element being heated.

FIGS. 3(a)–(c) are graphs showing one cycle of heat treatment by the TLD reader. Those graphs have the same time scale and are hence related. The TLD reader performs the same heat treatment cyclically on each element 7. One cycle of heat treatment includes three heating stages identified as preheating, read-out and annealing. The heating of each element 7 begins with the preheating stage, then moves on to the read-out stage and ends with the annealing stage. The preheating is conducted to remove energy induced in the TL element through exposure to noise energies, such as ultraviolet rays. The annealing is for erasing any residual energy in the element 7 to place it in condition for reuse. Thermoluminescence observed during the preheating and annealing stages is considered interfering and disregarded from calculation of a radiation dose. Thus, integration is performed only on the thermoluminescence observed during the read-out stage.

The graph of FIG. 3(a) plots two items with respect to time. The top line represents the intensity of the lamp 12. The bottom line represents whether photon counting is occurring or not. As shown in FIG. 3(a), the control unit 15 sends three pulses to the lamp 12 through the power supply 14. The lamp 12 is turned on and off three times in concurrence with the pulses during one cycle of heat treatment. Each pulse is associated with one of the three stages and serves to trigger the associated stage. The widths of the three pulses and the intervals between two adjacent pulses are defined by nine parameters $T_0$, $T_1$, $T_2$, $T_3$, $T_4$, $T_5$, $T_6$, $T_7$ and $T_8$. $T_0$ defines a time between the beginning of the first pulse and the beginning of photon counting by the control unit 15; $T_1$ defines a time between the beginning of the photon counting and the end of the first pulse; $T_2$ defines a time interval between the first and second pulses; $T_3$ defines a time between the beginning of the second pulse and the beginning of the integration by hybrid integrator 22; $T_4$ defines a time between the beginning of the integration and the end of the second pulse; $T_5$ defines a time between the end of the second pulse and the end of the integration; $T_6$ defines a time between the end of the integration and the beginning of the third pulse; $T_7$ defines the width of the third pulse; and $T_8$ defines a time between the end of the third pulse and the end of the photon counting by the hybrid integrator 22. Thus, the hybrid integrator 22 performs the photon counting for a time period defined by $T_1+T_2+T_3+T_4+T_5+T_6+T_7+T_8$. The control unit 15 performs the integration for period defined by $T_4+T_5$.

These parameters have been selected through experiments so that the element 7 will be heated to the optimum temperature for the optimum time during each of the three stages. The selected parameters are programmed in the control unit 15. The table below shows typical programmed parameters used in this invention.

| $T_{0(ms)}$ | $T_{1(ms)}$ | $T_{2(ms)}$ | $T_{3(ms)}$ | $T_{4(ms)}$ | $T_{5(ms)}$ | $T_{6(ms)}$ | $T_{7(ms)}$ | $T_{8(ms)}$ |
|---|---|---|---|---|---|---|---|---|
| 1 | 65 | 500 | 50 | 45 | 400 | 150 | 35 | 1700 |

The three heat pulses defined by these nine parameters raise the temperature of the element 7 in such a manner as shown in FIG. 3(b). The temperature curve as shown in FIG. 3(b) is obtained through an experiment in which the photomultiplier 14 is replaced with a heat sensor. Generally, the temperature of the element 7 steps up at the beginning of each stage and levels off during the stages. By carefully selecting the above parameters, the temperature of the element 7 can be maintained at the optimum level during each stage. The optimum temperature for each stage varies depending on the kind of a TL element used. For the TL element used in this invention, such as $CaSO_4$ or $Li_2B_4O_7$, the optimum temperature for the preheating stage is within the range of about 100° C. to about 150° C. The optimum temperature for the read-out stage is within the range of about 250° C. to about 300° C. The optimum temperature for the annealing stage is within the range of about 300° C. to about 350° C. These optimum temperature ranges are stored in the control unit 15 and, as explained later, are used to detect deviation of the heating temperature from the optimum level.

FIG. 3(c) shows a photon count curve. This photon count curve is obtained by plotting photon counts from the hybrid integrator 22 as a function of time. This curve is called "glow curve" and shows the intensity of thermoluminescence as a function of time. The glow curve has three peaks I, II and III. The first peak I appears during the preheating stage. This peak is caused by noise energies and should be disregarded. The middle peak II appears during the read-out stage and reflects doses of radiation received by the element 7. The third peak III appears during the annealing stage. The peak III is caused by residual energy and should also be disregarded. As explained above, the control unit 15 performs integration for a time period defined by $T_4+T_5$. The time period $T_4+T_5$ is defined such that it covers thermoluminescence caused by radiation to be measured and exclude interfering thermoluminescence caused by noise and residual energies. As a result of the integration, the area of the shaded potion of the glow curve in FIG. 3(c) is calculated, which represents radiation doses received by the element 7.

While heating a TL element 7, the control unit 15 receives signals from the heat flux sensor 19. Based on the signals from the heat flux sensor 19, the control unit 15 calculates the temperature of the TL element being heated. The inventors of this invention have found and confirmed through experiments that the following equation approximates very well the actual temperature of the TL element 7 being heated:

$$T_{i+1}=T_i+A(hf_i-B(x^{Ti/\tau}-1))+C, \qquad (1)$$

where $T_i$ is a calculated temperature at a particular time i; $hf_i$ is reading of heat energy by the heat flux sensor at a particular time i; $(x^{Ti/\tau}-1)$ is a heat loss term wherein x and $\tau$ are heat loss constants; and A, B and C are scaling factors. The scaling factors A, B and C and the heat loss constants x and $\tau$ are selected through computer simulation so that the above equation will achieve the best approximation.

The temperatures calculated by using the above equation (1) are used to determine if remedial action is necessary. In the TLD reader of this invention, the control unit 15 determines, based on the optimum temperature ranges stored in it, whether the temperature it just calculated falls within the optimum temperature range for that time point. If it is determined that the calculated temperature falls out of the optimum temperature range, responsive action is taken to prevent inaccurate radiation dose measurements. In the TLD reader of this invention, if it is determined that the calculated temperature falls out of the optimum temperature range, the control unit 15 will activate an alarm device and stop processing the badges.

In the second preferred embodiment of this invention, the control unit 15 further comprises a heat controller to control heat energy output from the lamp 12. The second embodiment of this invention includes all of the mechanical and electrical elements of the first embodiment. Therefore, the explanations given with respect to the first embodiment are all applicable to the second embodiment. The second embodiment further includes a heating rate data stored in the control unit 15. The heating rate data represents the average slope of the temperature curve in FIG. 3(b) observed during time period $T_0+T_1$.

While heating the element 7, the control unit 15 calculates an average increase rate of the temperatures it calculated during time period $T_0+T_1$. The control unit 6 then compares the calculated increase rate with the stored heating rate. If the increase rate is lower than the stored heating rate, the lamp 12 is outputting less heat energy than it is supposed to be. If the increase rate is higher than the stored heating rate, the lamp 12 is outputting more heat energy than it is supposed to be. Therefore, if it is determined that the increase rate is lower than the stored heating rate, the control unit 15 instructs the power supply 14 during the next heat treatment cycle to raise the heights of the three pulse sent to the lamp 12. The heat energy output from the lamp 12 increases, accordingly. Conversely, if it is determined that the increase rate is higher than the stored heating rate, the control unit 15 instructs the power supply 14 during the next heat treatment cycle to lower the heights of the pulses sent to the lamp 12. The heat energy output from the lamp 12 decreases, accordingly.

In the third preferred embodiment of this invention, the control unit 15 also comprises a heat controller to control heat energy output from the lamp 12. The third embodiment of this invention includes all of the mechanical and electrical elements of the second embodiments except that the nine parameters $T_0$, $T_1$, $T_2$, $T_3$, $T_4$, $T_5$, $T_6$, $T_7$ and $T_8$ are variable and that the parameters given in the table are used as initial parameters.

Just as in the second embodiment, the control unit 15 of the third embodiment calculates an average increase rate of the temperatures it calculated during time period $T_0+T_1$. The control unit 15 then compares the calculated increase rate with the stored heating rate. If it is determined that the increase rate is lower than the stored heating rate, the control unit 15 instructs the power supply 14 during the next heat treatment cycle to widen the widths of the three pulse. The heat energy output from the lamp 12 increases, accordingly. Conversely, if it is determined that the increase rate is higher than the slope, the control unit 15 instructs the power supply 14 during the next heat treatment cycle to narrower the widths of the pulses. The heat energy output from the lamp 12 decreases, accordingly. There are three ways to change the widths of the pulses. In the first way, the beginning timing of each pulse is changed while the intervals between the end timing of adjacent pulses are made constant. In the second way, the end timing of each pulse is changed while the intervals between the beginning timing of adjacent pulses are made constant. In the third way, both beginning and end timing of each pulse is changed while the intervals between the centers of adjacent pulses are made constant.

Although the invention had been should and described with respect to preferred embodiments, it will be apparent that equivalent alterations and modifications will occur to others skilled in the art upon the reading and understanding of this specification. The present invention includes all such equivalent alterations and is limited only by the scope of the following claims.

What is claimed is:

1. A method of measuring radiation doses sustained by a thermoluminescence element, comprising the steps of heating said element by a heat source to a temperature in an optimum heating temperature range peculiar to the kind of said element, detecting by a photo detector thermoluninescence released from said element being heated and determining the radiation doses based on the intensity of the thermolumininescence released over a predetermined time said method characterized in further comprising the steps of:
   a) detecting an amount of heat energy transferred from said heat source to said element;
   b) calculating a temperature of said element based on said detected amount of heat energy;
   c) determining if said calculated temperature falls within said optimum heating temperature range; and
   d) taking responsive action to prevent an inaccurate measurement of the radiation doses if said calculated temperature falls outside said optimum heating temperature range.

2. A method as set forth in claim 1, wherein the heat energy output from said heat source is detected between said heat source and said element.

3. A method as set forth in claim 1, further including the steps of:
   a) calculating an increase rate of said calculated temperature;
   b) comparing said calculated increase rate with a predetermined optimum heating rate; and
   c) increasing the heat energy output from said heat source if the calculated increase rate is lower than said predetermined optimum heating rate, and decreasing the heat energy output from said heat source if the calculated increase rate is higher than said predetermined optimum heating rate.

4. A method as set forth in claim 3, wherein the heat energy is output from said heat source in the form of heat pulses.

5. A method as set forth in claim 4, wherein increasing or decreasing the heat energy output is accomplished by changing heights of said heat pulses.

6. A method as set forth in claim 4, wherein increasing or decreasing the heat energy output is accomplished by changing widths of said heat pulses.

7. A method as set forth in claim 6, wherein the widths of said heat pulses are changed without changing intervals between the beginning timing of adjacent pulses.

8. A method as set forth in claim 1, wherein said steps (a) and (b) include the steps of:
   detecting during successive intervals an amount of heat energy transferred from said heat source to said element;
   calculating a difference between an amount of heat energy that has dissipated from said element during each interval and a detected amount of heat energy that has been transferred during the same interval from said heat source to said element;
   converting a calculated difference for each interval into a rise in temperature of said element during each interval; and
   summing rises in temperature of said element over intervals.

9. A method as set forth in claim 8, wherein an amount of heat energy that has dissipated from said element during one interval is a function of the temperature of said element at the beginning of said one interval.

10. A method as set forth in claim 9, wherein the temperature of said element is expressed by the following equation:

$$T_{i+1}=T_i+A(hf_i-B(x^{Ti/}-1))+C,$$

wherein $T_i$ is the temperature of said element at interval(i); $hf_i$ is a detected amount of heat energy that has been transferred during interval(i) from said heat source to said element; $B(x^{Ti/}-1)$ is an amount of heat energy that has dissipated from the element during interval(i); x and are heat loss constants; and A, B and C are scaling factors.

11. An apparatus for measuring radiation doses sustained by a thermoluminescence element, comprising a heat source for heating said element to a temperature in an optimum heating temperature range peculiar to the kind of said element, a photo detector for detecting thermoluminescence released from said element being heated and means for determining the radiation doses based on the intensity of said thermoluminescence released over a predetermined time, said apparatus characterized in further comprising:
   a) a heat energy sensor tor detecting an amount of heat energy transferred from said heat source to said element;
   b) means for calculating a temperature of said element based on the amount of heat energy detected by said energy sensor; and
   c) means for determining if said calculated temperature falls within said optimum heating temperature range, wherein responsive action is taken to prevent an inaccurate measurement of the radiation doses if said calculated temperature falls outside said optimum heating temperature range.

12. An apparatus as set forth in claim 11, wherein said energy sensor is provided between said heat source and said element.

13. An apparatus as set forth in claim 12, wherein said heat source is fronted with a reflector for focusing the heat energy onto said element, and said energy sensor is attached to said reflector.

14. An apparatus as set forth in claim 11, further comprising:
   a) means for calculating an increase rate of said calculated temperature;

b) means for comparing said calculated increase rate with a predetermined optimum heating rate; and c) a heat controller for controlling said heat source to increase the heat energy output from said heat source if said calculated increase rate is lower than said predetermined optimum heating rate and decreasing the heat energy output from said heat source if said calculated increase rate is higher than said predetermined optimum heating rate.

15. An apparatus as set forth in claim 14, wherein the heat energy is output from said heat source in the form of heat pulses.

16. An apparatus as set forth in claim 15, wherein increasing or decreasing of the heat energy output is accomplished by changing heights of said heat pulses.

17. An apparatus as set forth in claim 15, wherein increasing or decreasing of the heat energy output is accomplished by changing widths of said heat pulses.

18. An apparatus as set forth in claim 17, wherein the widths of said heat pulses are changed without changing intervals between the beginning timing of adjacent pulses.

19. An apparatus as set forth in claim 11, wherein said heat energy sensor detects during successive intervals an amount of heat energy transferred from said heat source to said element, and said means for calculating a temperature of said element further includes:

means for calculating a difference between an amount of heat energy that has dissipated from said element during each interval and a detected amount of heat energy that has been transferred during the same interval from said heat source to said element;

means for converting a calculated difference for each interval into a rise in temperature of said element during each interval; and means for summing rises in temperature of said element over intervals.

20. A method as set forth in claim 19, wherein an amount of heat energy that has dissipated from said element during one interval is a function of the temperature of said element at the beginning of said one interval.

21. A method as set forth in claim 20, wherein the temperature of said element is expressed by the following equation:

$$T_{i+1} = T_i + A(hf_i - B(x^{Ti/y} - 1)) + C,$$

wherein $T_i$ is the temperature of said element at interval i; $hf_i$ is a detected amount of heat energy that has been transferred during interval i from said heat source to said element; $B(x^{Ti/y}-1)$ is an amount of heat energy that has dissipated from the element during interval i; x and are heat loss constants; and A, B and C are scaling factors.

* * * * *

UNITED STATES PATENT AND TRADEMARK OFFICE
CERTIFICATE OF CORRECTION

PATENT NO. : 6,005,231
DATED : December 21, 1999
INVENTOR(S) : Steven J. Lanovich et al.

It is certified that error appears in the above-identified patent and that said Letters Patent is hereby corrected as shown below:

On the Title Page

Column 1,
Item [75], after "Chicago," insert --Yoshikazu Tatsumi, Bloomingdale,--.

In the Claims

Claim 10,
Line 4, delete "$T_{i+1} = T_i + A(hf_i - B(x^{Til} - 1)) + C$," and substitute
--$T_{i+1} = T_i + A(hf_1 - B(x^{Til\tau} - 1)) + C$,-- in its place.
Line 8, delete "$B(x^{Til} - 1)$" and substitute --$B(x^{T/t} - 1)$-- in its place.
Line 9, delete "$x$ and" and substitute --$x$ and $\tau$-- in its place.

Claim 21,
Line 4, delete "$T_{i+1} = T_i + A(hf_i - B(x^{Til} - 1)) + C$," and substitute
--$T_{i+1} = T_i + A(hf_1 - B(x^{Tilt} - 1)) + C$,-- in its place.

UNITED STATES PATENT AND TRADEMARK OFFICE
CERTIFICATE OF CORRECTION

PATENT NO.    : 6,005,231
DATED         : December 21, 1999
INVENTOR(S)   : Steven J. Lanovich et al.

It is certified that error appears in the above-identified patent and that said Letters Patent is hereby corrected as shown below:

Claim 21 contd.

Line 8, delete "$\mathbf{B}\ (x^{Til} - \mathbf{1})$" and substitute --$\mathbf{B}(x^{Tilt} - \mathbf{1})$-- in its place.
Line 9, delete "$x$ and " and substitute --$x$ and $\tau$-- in its place.

Signed and Sealed this

Nineteenth Day of June, 2001

*Attest:*

NICHOLAS P. GODICI
*Attesting Officer*  *Acting Director of the United States Patent and Trademark Office*